(12) United States Patent
Shirai

(10) Patent No.: US 10,901,534 B2
(45) Date of Patent: Jan. 26, 2021

(54) IDENTIFICATION COMPONENT, WRITING INSTRUMENT, AND HANDWRITING INPUT SYSTEM

(71) Applicant: SHARP KABUSHIKI KAISHA, Sakai (JP)

(72) Inventor: Katsunori Shirai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/285,789

(22) Filed: Feb. 26, 2019

(65) Prior Publication Data

US 2019/0265809 A1 Aug. 29, 2019

(30) Foreign Application Priority Data

Feb. 26, 2018 (JP) .................................. 2018-032452

(51) Int. Cl.
*G06F 3/0354* (2013.01)
*G06F 3/046* (2006.01)
*H02J 50/90* (2016.01)

(52) U.S. Cl.
CPC .......... *G06F 3/03545* (2013.01); *G06F 3/046* (2013.01); *H02J 50/90* (2016.02)

(58) Field of Classification Search
None
See application file for complete search history.

(56) References Cited

U.S. PATENT DOCUMENTS

| | | | | |
|---|---|---|---|---|
| 2002/0074171 | A1* | 6/2002 | Nakano | G06F 3/03545 178/18.01 |
| 2007/0279233 | A1* | 12/2007 | Ryckman | G09F 3/10 340/572.8 |
| 2017/0341458 | A1* | 11/2017 | Kaneda | B43K 24/10 |

FOREIGN PATENT DOCUMENTS

JP 2001-265513 A 9/2001

\* cited by examiner

*Primary Examiner* — Matthew Yeung
(74) *Attorney, Agent, or Firm* — ScienBiziP, P.C.

(57) ABSTRACT

An identification component is attached to a pen and includes a resonance coil formed to have an external shape thinner than the writing instrument, an resonance circuit that outputs an identification signal used for identifying an attribute of the pen, and a holding member that holds the resonance coil close to one end of the pen where a pen tip is present to render the longitudinal direction of the resonance coil parallel to the longitudinal direction of the pen.

7 Claims, 10 Drawing Sheets

FIG. 6A

| IDENTIFICATION COMPONENT TYPE | $f_0$ (kHz) | WRITING COLOR |
|---|---|---|
| ID1 | 100 | BLACK |
| ID2 | 120 | BLUE |
| ID3 | 140 | GREEN |
| ID4 | 160 | YELLOW |
| ID5 | 180 | ORANGE |
| ID6 | 200 | RED |

FIG. 6B

| IDENTIFICATION COMPONENT TYPE | $f_0$ (kHz) | WRITING COLOR | PEN TIP SIZE | PEN TIP SHAPE |
|---|---|---|---|---|
| ID-a | 100 | BLACK | FINE | ● |
| ID-b | 105 | BLACK | FINE | ■ |
| ID-c | 110 | BLACK | THICK | ● |
| ID-d | 115 | BLACK | THICK | ■ |
| ID-e | 120 | BLUE | FINE | ● |
| ID-f | 125 | BLUE | FINE | ■ |
| ID-g | 130 | BLUE | THICK | ● |
| ID-h | 135 | BLUE | THICK | ■ |
| ID-i | 140 | GREEN | FINE | ● |
| .. | .. | .. | .. | .. |
| ID-u | 215 | RED | THICK | ● |

$$f_0 = \frac{1}{2\pi LC}$$

IDENTIFICATION COMPONENT, WRITING INSTRUMENT, AND HANDWRITING INPUT SYSTEM

BACKGROUND

1. Field

The present disclosure relates to a writing instrument that leaves handwriting, such as characters, on a board, an identification component that is attached to such a writing instrument, and a handwriting input system that includes the writing instrument and the board.

2. Description of the Related Art

Taking the place of conventional boards without hard-copy functionality, an electronic board device capable of outputting a hard copy of handwritten content by mechanically scanning a board has become widespread.

For example, Japanese Unexamined Patent Application Publication No. 2001-265513 discloses a coordinate reading apparatus that detects the position of an electronic pen on an electronic board by employing an electromagnetic induction method. In the coordinate reading apparatus, the electronic pen includes a coil for supplying electric power. The electronic board includes multiple loop coils that are disposed on the back side of the electronic board and that each extend in the vertical direction or the horizontal direction. A high-frequency voltage is applied to the multiple loop coils and an electromotive force is produced in the coil for supplying electric power to the electronic pen by electromagnetic induction, and as a result, an alternating electric field is produced in the electronic pen. By detecting the alternating electric field with the use of the multiple loop coils of the electronic board, the position of a handwriting input is detected.

Such a conventional electronic pen (a writing Instrument), in which a coil, an electronic circuit, and the like are incorporated when manufactured as described above, is provided as an electronic pen specific to the electronic board by business operators applying such a product form in business. As a result, the total cost of such an electronic pen and such an electronic board increases and this may be a factor that prevents electronic board devices from being widely used. In particular, since the aforementioned electronic pen needs to include a coil and an electronic circuit corresponding to attributes of the pen, such as a writing color, there is a problem of a more complex structure in addition to an increased cost.

The present disclosure provides an identification component, a writing instrument, and a handwriting input system that can decrease the cost by employing a simpler configuration.

SUMMARY

An identification component according to an aspect of the present disclosure is attached to a writing instrument and includes a resonance unit formed to have an external shape thinner than the writing instrument, an identification circuit that outputs an identification signal used for identifying an attribute of the writing instrument, and a holding member that holds the resonance unit close to one end of the writing instrument where a pen tip is present to render the longitudinal direction of the resonance unit parallel to the longitudinal direction of the writing instrument.

A writing instrument according to another aspect of the present disclosure includes a pen body, a pen tip that leaves visible handwriting on a board when the pen tip comes into contact with the board, and the identification component that is held in an area between the center of the pen body and the pen tip.

A handwriting input system according to a further aspect of the present disclosure includes a writing instrument and a board for writing. The writing instrument includes a pen body, a pen tip that leaves visible handwriting on the board when the pen tip comes into contact with the board, and the identification component that is held in an area between the center of the pen body and the pen tip. The board for writing includes a pen identification section that detects in a contactless manner an identification signal output by the identification component and a coordinate detection section that detects position coordinates of a position on the board where the pen tip of the writing instrument is in contact with the board.

BRIEF DESCRIPTION OF THE DRAWINGS

FIGS. 6A and 6B are tables illustrating examples of definitions in which a resonant frequency and attributes of a pen are associated with each other according to a first embodiment;

DESCRIPTION OF THE EMBODIMENTS

The present disclosure will be further described in detail below with reference to the drawings. The following descriptions are considered in all respects as illustrative and are not restrictive.

First Embodiment

Configuration of Handwriting Input System

Figure 1:
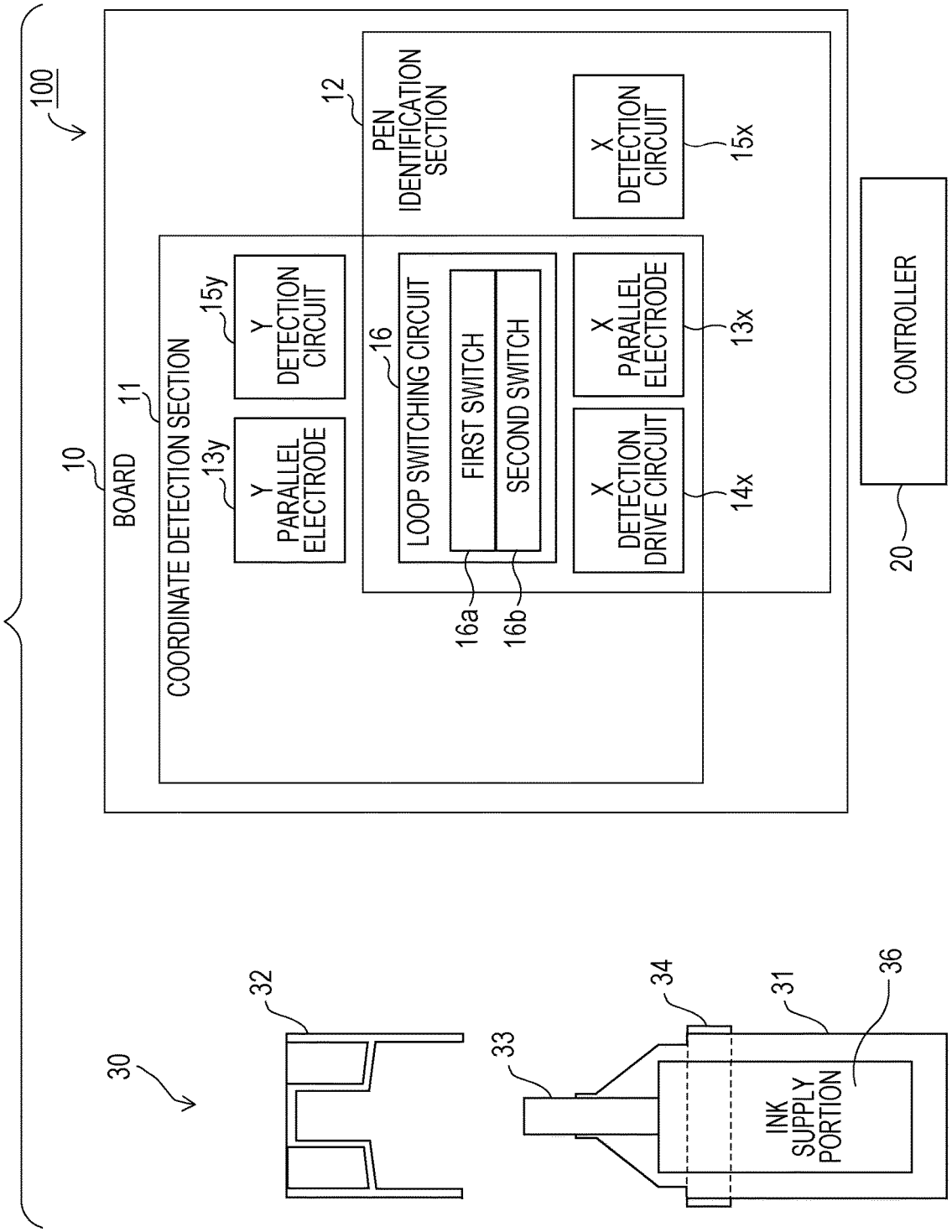
FIG. 1 illustrates an example configuration of a handwriting input system according to the present disclosure.
Figure 2:
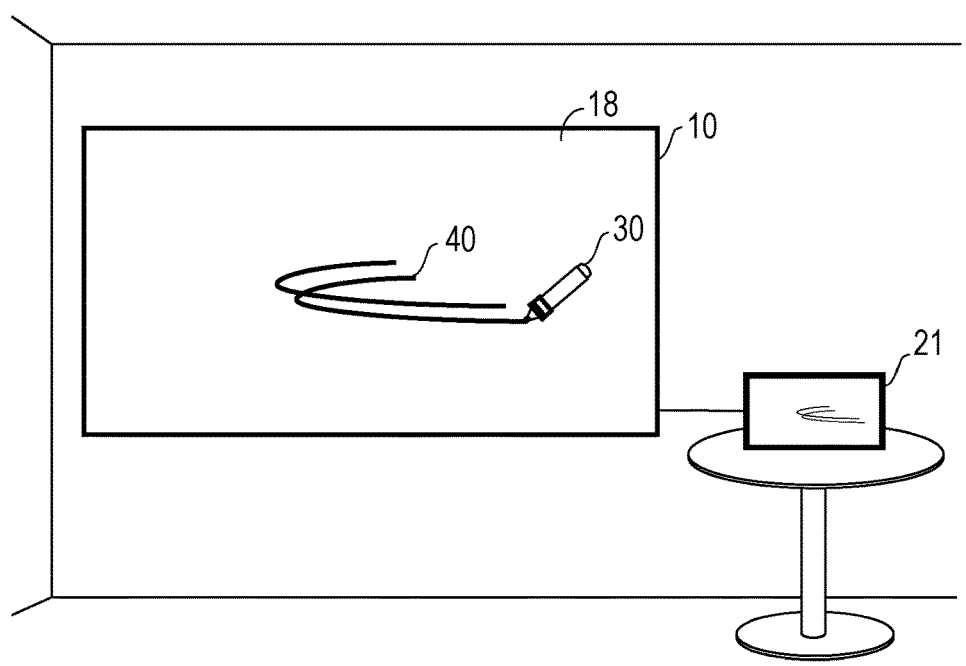
FIG. 2 illustrates an example of the handwriting input system illustrated in FIG. 1 in use.
Figure 3:
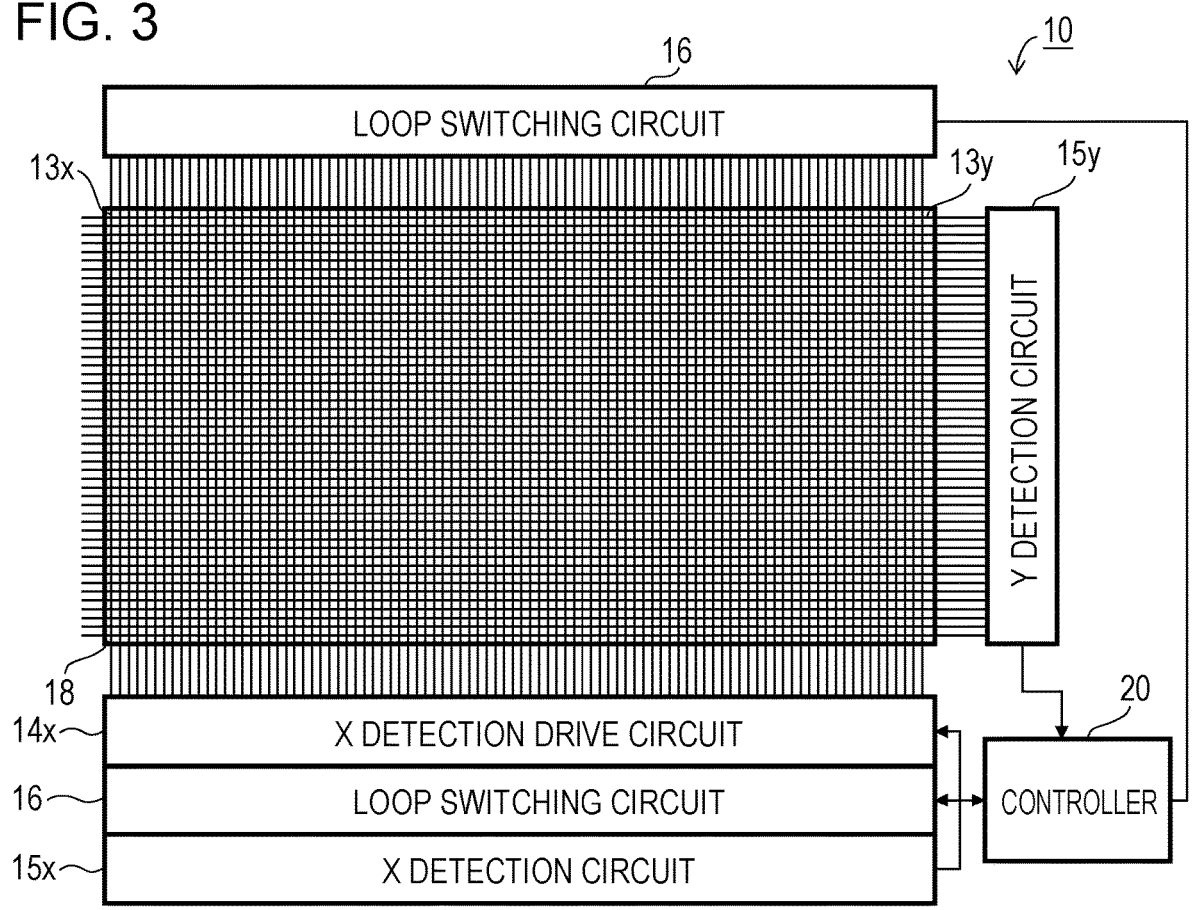
FIG. 3 illustrates a configuration of a board illustrated in FIG. 1, particularly an arrangement of an X parallel electrode and a Y parallel electrode.
Figure 4:
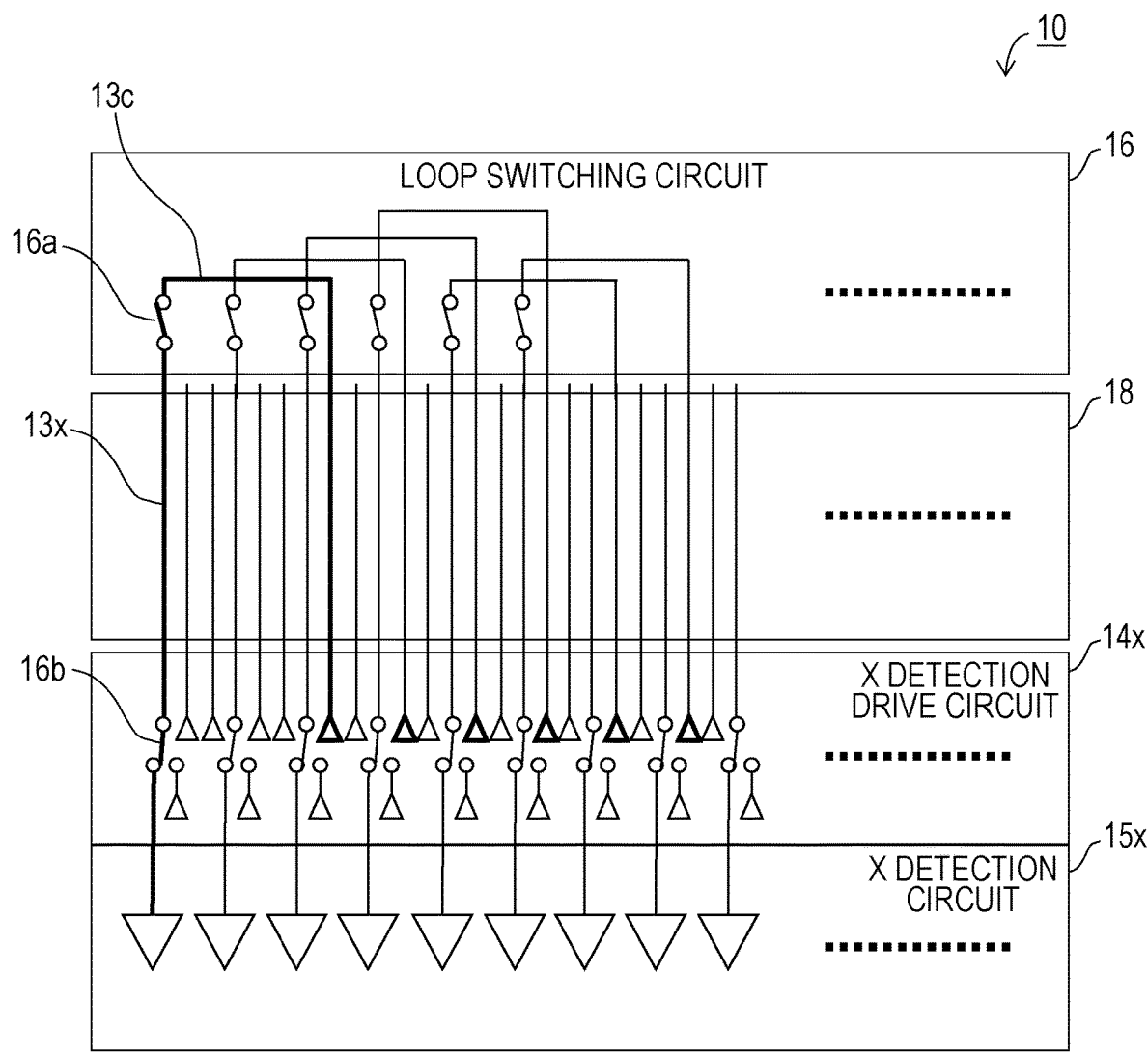
FIG. 4 is a diagram for describing a function of a loop switching circuit of the board illustrated in FIG. 1.
Figure 5:
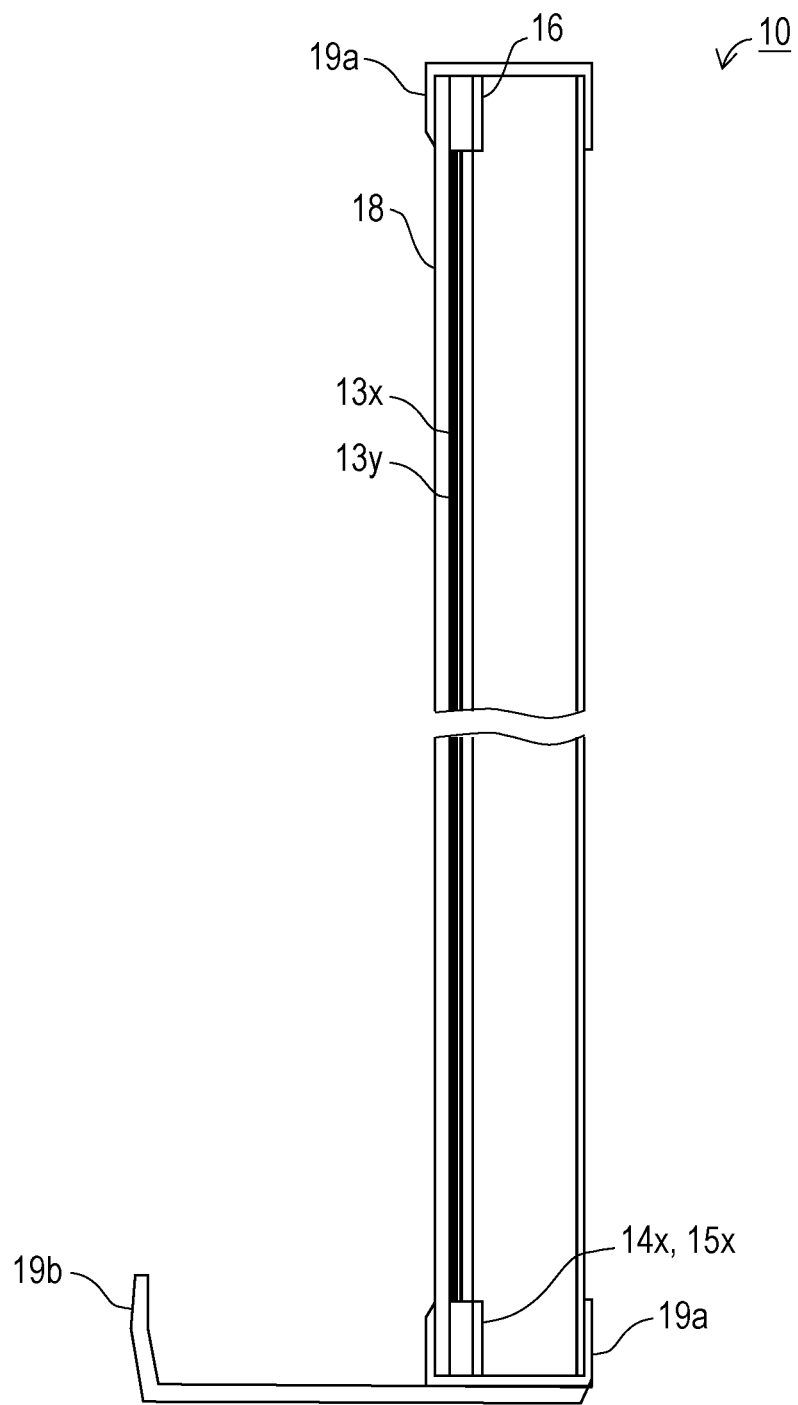
FIG. 5 is a sectional view of a configuration in a vertical direction of the board illustrated in FIG. 1.

FIG. 1 illustrates an example configuration of a handwriting input system according to the present disclosure. FIG. 2 illustrates an example of the handwriting input system illustrated in FIG. 1 in use. FIG. 3 illustrates a configuration of a board 10 illustrated in FIG. 1, particularly an arrangement of an X parallel electrode and a Y parallel electrode. FIG. 4 is a diagram for describing a function of a loop switching circuit of the board 10 illustrated in FIG. 1. FIG. 5 is a sectional view of a configuration in a vertical direction of the board 10 illustrated in FIG. 1.

A handwriting input system 100 illustrated in FIG. 1 is composed mainly of a pen 30 and the board 10. The pen 30 includes a pen body 31, the cap 32, a pen tip 33, an identification component 34, and an ink supply portion 36. The pen 30 is illustrated in FIG. 1 in a manner in which the shape of the pen 30 can be viewed. The identification component 34 includes an identification circuit, which is not illustrated in FIG. 1. A detailed configuration of the identification component 34 will be described later.

The cap 32, which is attachable to and detachable from the pen body 31, covers the pen tip 33 when attached to the pen body 31 so as to not expose the pen tip 33.

In this embodiment, the pen tip 33 is made of felt impregnated with ink. The structure of the pen 30 is typically that of a marker pen for a white board. When the point of the pen tip 33 that is exposed by removing the cap 32 comes into contact with a writable area 18 of the board 10, ink adheres to the contact position and leaves handwriting on the board 10 (see FIG. 2).

The end of the pen tip 33 opposite to the point is in contact with the ink supply portion 36 storing ink, and ink is supplied from the ink supply portion 36 to the pen tip 33 by capillary action.

The identification component 34 is attached around the periphery of the pen body 31 close to the position where the cap 32 is attached. As mentioned above, the identification component 34 includes the identification circuit, which is not illustrated in FIG. 1. In one specific example of a configuration of the identification circuit, the identification circuit is an LC resonant circuit consisting of an inductor component L and a capacitor component C.

In this embodiment, the writable area 18 of the board 10 is configured such that handwriting produced by using the pen 30 remains on the writable area 18 of the board 10. In addition, the writable area 18 is preferably configured such that the handwriting on the writable area 18 can be deleted. The board 10 may be disposable if the board 10 is made inexpensively, but the board 10 is preferably made such that the handwriting on the board 10 can be deleted and thus the board 10 can be repeatedly reused for writing.

Referring to FIG. 5, the periphery of the board 10 is covered by a peripheral member 19a to improve the board's strength. The writable area 18 is on the front surface (the surface facing the left side of FIG. 5) of the board 10 covered by the peripheral member 19a at its periphery. A pen holder 19b is disposed at the lower end of the board 10. When the pen 30 is a marker pen, the corresponding writable area 18 has a surface similar to that of a marker board.

As illustrated in FIG. 1, when divided by main function, the board 10 has a coordinate detection section 11 and a pen identification section 12.

The coordinate detection section 11 detects the coordinates of a position where the pen tip 33 of the pen 30 comes into contact with the board 10. The pen identification section 12 detects an identification signal transmitted from the identification component 34 attached to the pen 30.

In one configuration example in which these functions are implemented, the coordinate detection section 11 of this embodiment operates as a capacitance-type touch panel. Furthermore, the pen identification section 12 operates as an electromagnetic induction circuit and detects the identification signal transmitted from the identification component 34.

The coordinate detection section 11 is constituted by a Y parallel electrode 13y, a Y detection circuit 15y, an X parallel electrode 13x, an X detection drive circuit 14x, and a loop switching circuit 16. Among these, the X parallel electrode 13x and the X detection drive circuit 14x of the coordinate detection section 11 share hardware devices with those of the pen identification section 12. The loop switching circuit 16 switches a loop between the case where the shared hardware devices are used for the coordinate detection section 11 and the case where the shared hardware devices are used for the pen identification section 12.

The pen identification section 12 includes the X parallel electrode 13x and the X detection drive circuit 14x, which are shared with the coordinate detection section 11, the loop switching circuit 16 for switching the loop, and additionally, an X detection circuit 15x.

The X parallel electrode 13x is constituted by multiple electrodes that are embedded close to the surface of the board 10 on which writing is performed by using the pen 30. The multiple electrodes of the X parallel electrode 13x are arrayed in an X direction (horizontal direction), and each extends in a Y direction (vertical direction) (see FIG. 3).

Similarly, the Y parallel electrode 13y is constituted by multiple electrodes that are embedded close to the surface of the board 10 on which writing is performed by using the pen 30. The multiple electrodes of the Y parallel electrode 13y are arrayed in the Y direction (vertical direction), and each extends in the X direction (horizontal direction) (see FIG. 3). The multiple electrodes of the Y parallel electrode 13y are embedded at a depth different from the depth at which the multiple electrodes of the X parallel electrode 13x are embedded. Accordingly, the multiple electrodes of the Y parallel electrode 13y cross toe multiple electrodes of the X parallel electrode 13x with an insulating layer of a given thickness interposed between them, and thus the Y parallel electrode 13y and the X parallel electrode 13x do not come into contact with each other (see FIG. 5).

It is noted that, regarding the material for the surface of the board 10 constituting the writable area 18, for example, neither an aluminum plate, which would electrically shield the X parallel electrode 13x and the Y parallel electrode 13y embedded close to the surface of the board 10, nor a steel plate, which would magnetically shield the X parallel electrode 13x and the Y parallel electrode 13y, are suitable. Rather, a resin material such as a melamine-coated epoxy resin material or a polycarbonate resin material, for example, is applicable.

As illustrated in FIG. 3, the X detection drive circuit 14x is connected to one end of the X parallel electrode 13x and applies a given voltage to each of the multiple electrodes of the X parallel electrode 13x. The voltage may vary between the case where the X detection drive circuit 14x functions as part of the coordinate detection section 11 and the case where the X detection drive circuit 14x functions as part of the pen identification section 12. The voltage is, for example, applied sequentially as an impulse-like voltage from the left-side electrode to the right-side electrode.

The Y detection circuit 15y determines the voltage or current induced in each electrode of the Y parallel electrode 13y by being driven by the X detection drive circuit 14x. With regard to the voltage or current, the coupling capacitance between the electrodes of the X parallel electrode 13x and the electrodes of the Y parallel electrode 13y differs between the case where a dielectric or a metal object is in contact with a portion that affects the coupling capacitance, that is, a portion of the board underneath which the X parallel electrode 13x crosses the Y parallel electrode 13y, and the case where a dielectric or a metal object is not in contact with the portion. For example, the coupling capacitance increases when the pen tip 33 impregnated with ink, or a human finger, comes into contact with the board because these are dielectric objects. Therefore, by detecting the change of coupling capacitance, the coordinates of a position where the pen tip 33 or a human finger is in contact with the board 10 can be detected. This is known as operation of the capacitance-type touch panel.

Since coupling capacitance typically differs between a human finger and the pen tip 33, whether a human finger or the pen tip 33 is being used can be determined by using not only the detected coordinates of a contact position but also the difference in the coupling capacitance.

As illustrated in FIG. 4, the loop switching circuit 16 includes a first switch 16a for switching a loop to connect or not connect two electrodes of the multiple electrodes of the X parallel electrode 13x at one electrode side, the two electrodes being spaced apart by a given distance. Coupling a pair of electrodes on one electrode side by using the first switch 16a forms a U-shaped current path. The U-shaped current path functions as an induction coil of the pen identification section 12. A second switch 16b is disposed at one end of the U-shaped current path.

The second switch 16b operates synchronously with the first switch 16a. In a state where the first switch 16a disconnects a pair of electrodes from each other, the second switch 16b couples one electrode of the pair to the X detection drive circuit 14x. Conversely, in a state where the first switch 16a connects a pair of electrodes with each other, the second switch 16b couples one electrode of the pair to the X detection circuit 15x. As a result, when a pair of electrodes are disconnected from each other, each electrode is driven by the corresponding X detection drive circuit 14x.

By contrast, when a pair of electrodes is connected to each other and a U-shaped current path is formed as an induction coil, the second switch 16b couples one electrode of the U-shaped current path to the X detection circuit 15x. The other electrode of the U-shaped current path is not coupled to a switch and is driven by the X detection drive circuit 14x.

In this embodiment, multiple U-shaped current paths serving as induction coils are arrayed in the X direction (horizontal direction).

When the loop switching circuit 16 causes the X parallel electrode 13x to operate for the pen identification section 12, for example, the multiple induction coils are driven sequentially from the left side to the right side. In FIG. 4, to illustrate that only the left side induction coil is driven, an induction coil 13c on the left side is illustrated with a thicker line than the lines of other induction coils. While changing the driving frequency, the X detection drive circuit 14x drives the other end of the induction coil 13c as a U-shaped current path. The X detection circuit 15x that is connected to one end of the induction coil 13c detects the current that corresponds to the frequency and that flows in the induction coil 13c. Subsequently, the same detection is performed for the induction coil to the right of the induction coil 13c and proceeds sequentially to the right-side induction coil.

The loop switching circuit 16 is desired for sharing the X parallel electrode 13x between the coordinate detection section 11 and the pen identification section 12.

When the identification component 34 is near an induction coil driven at a driving frequency corresponding to the resonant frequency of the identification component 34, a large resonant current flows in a resonance circuit due to electromagnetic coupling with the induction coil. Consequently, a large current flows in the induction coil. By determining the current in the X detection circuit 15x, it is possible to detect which resonant frequency identification component 34 exists in which area in the X direction.

In this embodiment, the resonant frequency of the identification component 34 is predetermined in association with attributes of the pen 30.

FIGS. 6A and 6B are tables illustrating examples of definitions in which a resonant frequency $f_0$ and the attributes of the pen 30 are associated with each other in accordance with this embodiment. The list illustrated in FIG. 6A illustrates an example in which the resonant frequency $f_0$ of the identification component 34 is associated with the ink color of the pen (the writing color). Different resonant frequencies $f_0$ are determined for pens of different colors: black, blue, green, yellow, orange, and red. In accordance with the writing color of the pen, a user attaches the identification component 34 that has the resonant frequency $f_0$ associated with the writing color.

The list illustrated in FIG. 6B illustrates an example in which not only the writing color of the pen 30 but also the attributes such as the pen tip size and the shape of the pen tip are determined in association with the resonant frequency $f_0$ corresponding to respective combinations of these attributes. By predetermining the unique resonant frequency $f_0$ corresponding to a single combination of multiple kinds of attributes as illustrated in the list in FIG. 6B, multiple kinds of attributes associated with the detected resonant frequency $f_0$ can be obtained. It is noted that the resonant frequency $f_0$ is not limited to the values indicated in FIGS. 6A and 6B and is selected in accordance with the proportion of the size of a resonance coil 341 (described later) of the identification component 34 and resonance energy (intensity). For example, the resonant frequency $f_0$ may be determined within the range of 400 to 700 kHz.

In the handwriting input system 100, when the coordinate detection section 11 detects the position coordinates of the pen tip 33 in the area where the pen identification section 12 detects the existence of the identification component 34, handwriting data according to the position coordinates and the attributes of the pen corresponding to the identification information can be generated.

The handwriting data may be generated by, for example, causing a personal computer to run a dedicated processing program in accordance with the information detected by the coordinate detection section 11 and the pen identification section 12. Alternatively, by incorporating a microcomputer on the board 10, not only the processing performed by the coordinate detection section 11, the pen identification section 12, or both, but also the processing for generating the handwriting data may be performed by the microcomputer.

In FIG. 1, a controller 20 represents a section that performs processing for generating handwriting data. The controller 20 is constituted mainly by a central processing unit (CPU) or a microcomputer and also by peripheral circuits such as a timer and an input/output circuit, and memory.

The controller 20 may be separated from the board 10 or integrated in the board 10, that is, incorporated in the board 10; in other words, the controller 20 may perform processing outside the handwriting input system according to this embodiment or may be included in the handwriting input system.

In the former case, the handwriting input system 100 detects handwriting and provides data as the basis for generating handwriting data. In the latter case, the handwriting input system 100 also carries out the processing for generating handwriting data.

When the processing of the handwriting input system 100 according to this embodiment includes the generation of handwriting data, in the handwriting input system 100, for example, a display device 21 may be connected to the controller 20 as illustrated in FIG. 2 and the content based on the generated handwriting data may be displayed in real time.

Needless to say, even if the content based on the handwriting data is not displayed on the display device 21, handwriting 40 written by using the pen 30 remains on the writable area 18 of the board 10.

The display device 21 is effective for verifying that the handwriting data generated by the controller 20 is identical to the handwriting 40 in the writable area 18.

The handwriting data reflects the attributes of the pen 30. For example, according to the definition illustrated in FIG. 6A, the writing color of the handwriting data displayed on the display device 21 coincides with the writing color of the handwriting 40. Furthermore, according to the definition illustrated in FIG. 6B, the thickness and the shape of the stroke represented by the displayed handwriting data reflects the size and the shape of the pen tip 33. If a hard copy of the handwriting data is printed by using a color printer (not illustrated), the obtained hard copy reflects the writing color, and additionally, the pen point size and the pen point shape.

Configuration Examples of Pen and Identification Circuit

Next, configurations of the pen 30 and an identification circuit according to this embodiment are further described in detail.

Figure 7A:
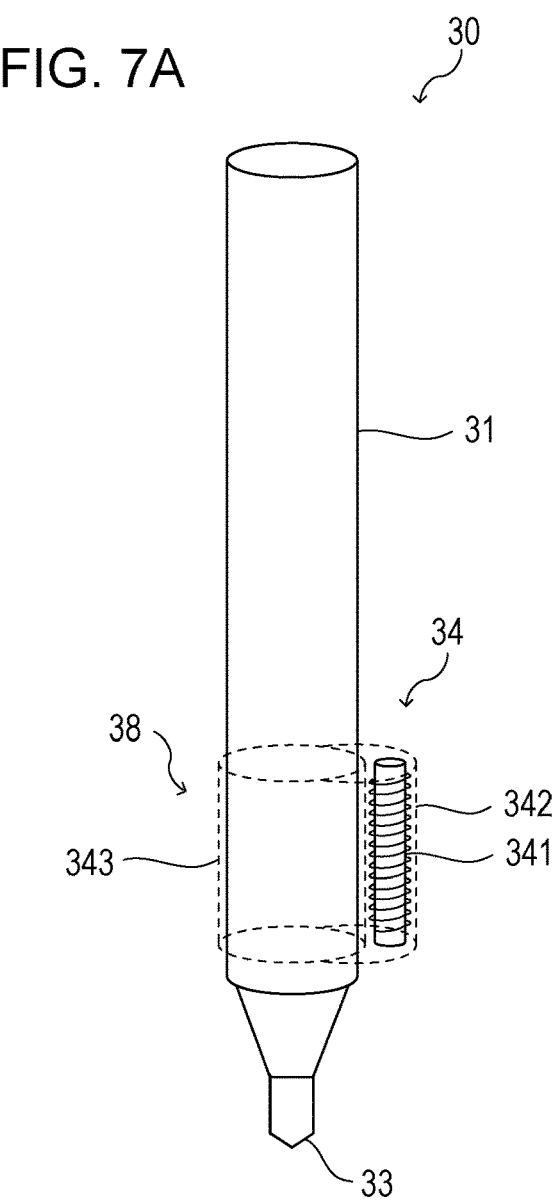
FIGS. 7A to 7D illustrate examples of an exterior of the pen and the identification component and an identification circuit as a resonance circuit according to the first embodiment.
Figure 7B:
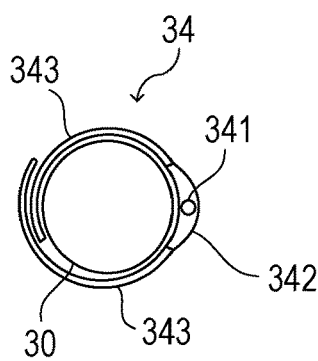
Figure 7C:
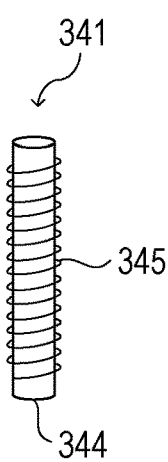
Figure 7D:
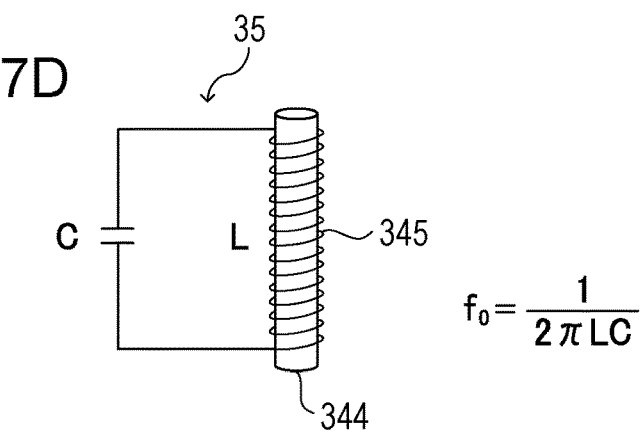

FIG. 7A illustrates a side view of the exterior of the pen 30 according to this embodiment, and more specifically, illustrates a mode of attaching the identification component 34 to the pen body 31 of the pen 30. FIG. 7B illustrates a top view of the exterior of the identification component 34 including an identification circuit. FIG. 7C illustrates a side view of the exterior of the resonance coil 341 (a resonance unit). FIG. 7D illustrates a resonance circuit 35 as the identification circuit.

As illustrated in FIG. 7A, the identification component 34 is attached close to the pen tip 33 of the pen body 31. The identification component 34 includes the resonance circuit 35 as the identification circuit (not illustrated in FIG. 7A) including the resonance coil 341 (the resonance unit), a housing unit 342 that accommodates the resonance coil 341, the holding member 343 that holds the identification component 34 together with the pen body 31.

The resonance coil 341 is constituted by an axial core 344 and a conductive wire 345 (for example, a litz wire) wound around the axial core 344 in a coil shape as illustrated in FIG. 7C. The axial core 344 is, for example, an iron core, such as a ferrite bar, having a diameter of 3 mm. The resonance coil 341 is formed in an elongated cylindrical shape extending toward the point of the pen 30 when the identification component 34 is attached to the pen 30. In addition, the resonance coil 341 is formed to be thinner than the pen 30.

The resonance circuit 35 is accommodated in the housing unit 342 in a fixed manner. The housing unit 342 accommodates the resonance coil 341 such that the axial direction of the resonance coil 341 (the longitudinal direction, that a direction perpendicular to the winding direction of the conductive wire 345) extends parallel to the axial direction (the longitudinal direction) of the pen 30, in other words, for example, such that the longitudinal direction of the resonance coil 341 and the longitudinal direction of the pen 30 are identical to each other.

FIG. 7D illustrates a configuration of the resonance circuit 35. As illustrated in FIG. 7D, the resonance circuit 35 is constituted by an inductor L and a capacitor C. The LC resonant circuit illustrated in FIG. 7D is formed, for example, such that the resonance coil 341 (the axial core 344 and the conductive wire 345) is covered with a resin and a capacitor is connected to both ends of the conductive wire 345. Such an LC resonant circuit may be formed by forming a circuit pattern by using a conductor on a film-like insulator, such as a flexible substrate, and connecting both ends of the insulator to form a ring.

The resonance circuit 35 having a different resonant frequency $f_0$ can be formed by changing at least one of the magnitude of the inductor L and the magnitude of the capacitor C. As a result, the resonance circuit 35 has a particular resonant frequency $f_0$ and outputs an identification signal used for identifying attributes of the pen 30. The identification signal represents identification information for identifying at least one of the writing color, the size of the pen tip of the writing instrument, and the shape of the pen tip of the writing instrument. In such a manner, multiple identification components 34 corresponding to respective resonant frequencies $f_0$ can be obtained as illustrated in FIGS. 6A and 6B.

Figure 8:
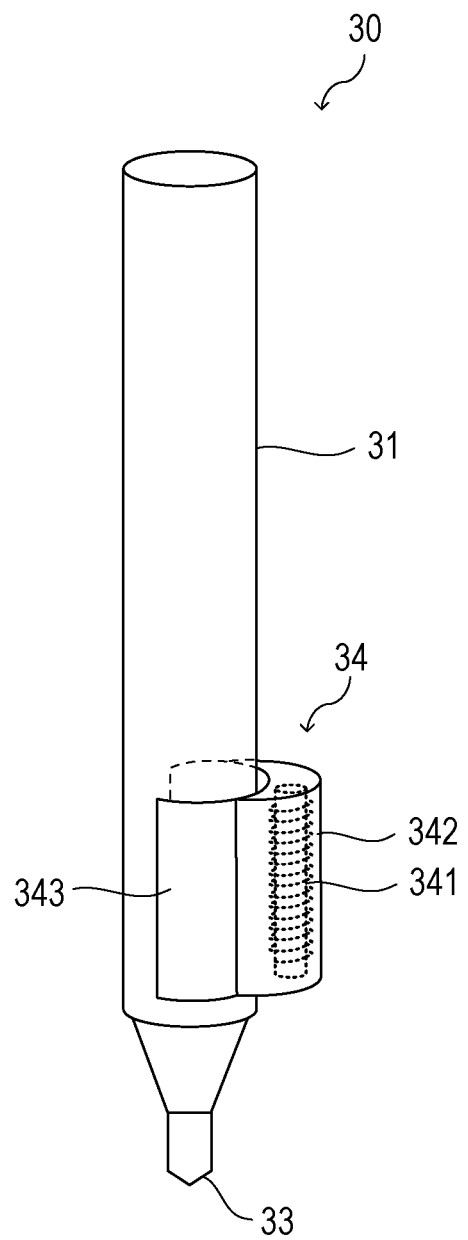
FIG. 8 illustrates another example of an exterior of the pen and the identification component according to the first embodiment.

The holding member 343 holds (fixes) the pen body and the housing unit 342 that accommodates the resonance circuit 35 together. The holding member 343 is implemented as, for example, a hook and loop fastener (see FIG. 7B), Magic Tape (registered trademark), double-sided tape, a holding belt (a holding band), or an adhesive. The holding member 343 may as implemented as a holder (a clip) as illustrated in FIG. 8, which is formed of, for example, a polycarbonate or a reinforced plastic. When the holding member 343 is formed in a holder shape, the holding member 343 has an inner diameter that enables the holding member 343 to fit tightly around the outer diameter of the pen body 31. Additionally, it is preferable that a member made of a material having elasticity, such as a rubber or a polyurethane resin, be disposed on the inner surface of the holding member 343 so that the identification component 34 can be attached to and held together with the pen body 31 even in the case of slight variation in the outside diameter of the pen body 31.

Furthermore, it is preferable that the holding member 343 hold the identification component 34 close to the point of the pen 30 in an attachable and detachable manner with respect to the pen 30. The holding member 343 holds the identification component 34 in an area between the center of the pen body 31 and the pen tip 33.

In this embodiment, the pen body 31 and the cap 32 may be of a commercially available marker pen.

As illustrated in FIG. 7B, the identification component 34 is held together with the pen body 31 by winding the holding member 343 (for example, a hook and loop fastener) around the pen body 31. The user uses the pen 30 in the state illustrated in FIG. 7B. Hence, a commercially available marker pen can also serve as the pen 30 according to this embodiment by attaching the identification component 34 to the commercially available marker pen.

As illustrated in FIG. 7A, the identification component 34 is preferably attached close to the pen tip 33 of the pen body 31. Furthermore, it is preferable that the identification component 34 be attached to the pen body 31 at a position that enables the cap 32 (see FIG. 1) to be neatly fitted to the pen body 31 while the identification component 34 is held together with the pen body 31. Moreover, the identification component 34 is preferably attached to (disposed at) a holding portion 38 (a portion held by a hand) that is held by the user when the user writes with the pen 30.

With this configuration, the resonance coil 341 of the identification component 34 is attached close to the pen tip 33 of the pen body 31 while extending along the outer peripheral surface (the side surface) of the pen 30 in the axial direction (the longitudinal direction) 31.

This configuration enables the identification component 34 to be easily attached to and detached from the pen 30. For example, the identification component 34 can be easily attached to a general-purpose pen of office supplies manufacturers that is purchased and used by users in everyday situations. When ink of the general-purpose pen has run out, the identification component 34 is easily detached from the general-purpose pen and then attached to a new general-purpose pen. As described above, for example, the identification component 34 is attached to a commercially available marker pen to be used, and when ink of the marker pen has run out, the identification component 34 is detached and then attached to a new marker pen; in other words, the identification component 34 is reusable. The aforementioned ferrite bar that serves as the axial core 344 of the resonance coil 341 may be formed in a plate having a thickness of, for example, 1 to 1.5 mm. In this manner, while maintaining the sensitivity of the resonance coil 341, the identification component 34 canal be made smaller and thinner.

The identification component 34 (the resonance coil 341 and the resonance circuit 35) may be disposed inside the pen 30. For example, the resonance coil 341 may be disposed in line with the pen tip 33 inside the pen 30 or disposed in a housing space that is cut out of the side surface of the pen body 31.

Second Embodiment

Figure 9:
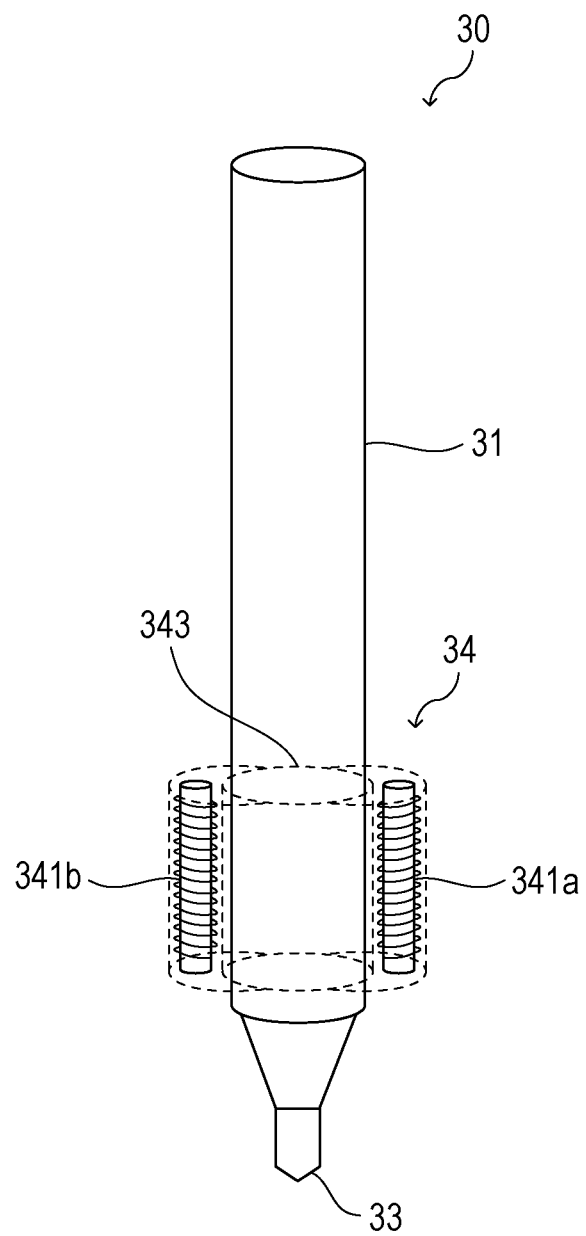
FIG. 9 illustrates an example of an exterior of a pen according to a second embodiment.

In the first embodiment, the identification component 34 is configured to include one resonance coil 341 and one resonance circuit 35. The number of the resonance coil 341 and the number of the resonance circuit 35 are, however, not limited to one and may be a multiple number. FIG. 9 illustrates a state in which the identification component 34 including two resonance coils 341a and 341b is attached to the pen body 31 of the pen 30. In this example, two resonance circuits 35 are disposed in association with the respective resonance coils 341a and 341b. FIG. 9 omits the illustration of the two resonance circuits 35.

In this configuration, the resonant frequency $f_0$ corresponding to the resonance coil 341a and the resonant frequency $f_0$ corresponding to the resonance coil 341b may differ from each other. This configuration enables the resonance coils 341a and 341b to be associated with different attributes of the pen 30 corresponding to the respective resonant frequencies $f_0$. The identification component 34 may include three or more resonance coils 341 and three or more resonance circuits 35.

Third Embodiment

The mode illustrated in FIGS. 7A to 7D is made on the basis that the pen body 31 includes the identification circuit corresponding to the attributes of the pen 30. The pen 30 is a marker pen in the above description, but it is not an essential requirement. The pen 30 may preferably be a writing instrument that leaves erasable handwriting on the board 10, for example, a ballpoint pen with erasable ink. At least a portion of the tip of the ballpoint pen is formed of a metal object. By designing a capacitance-type touch panel to suit the characteristics of the pen tip, position coordinates of the pen tip can be detected by the coordinate detection section 11.

The writable area 18 of the board 10 on which writing is performed by using the pen 30 as a writing instrument does not need to be a marker board. For example, when the pen 30 is a ballpoint pen, the writable area 18 may be made of a material suitable for writing with a ballpoint pen.

Moreover, the board 10 is not limited to a board-like structure having high stiffness, and may be, for example, a sheet-like structure.

Fourth Embodiment

In the description of the first embodiment, the identification circuit is an LC resonant circuit. However, the identification circuit is not limited to an LC resonant circuit, and may be implemented as a different mode.

For example, instead of a resonance circuit, a system employing a radio-frequency identification (RFID) technology may be applied for the identification circuit. RFID is a technology for reading data stored in an integrated circuit (IC) chip referred to as a radio frequency (RF) tag in a contactless manner by using a radio wave. The identification component 34 or the pen body 31 may include an RF tag instead of the resonance circuit 35 illustrated in FIGS. 7A to 7D and the pen identification section 12 of the board 10 may be a circuit for reading the RF tag.

In such a case, the RF tag stores, instead of the resonant frequency $f_0$ of the resonance circuit 35, information of a predetermined value corresponding to the attributes of the pen.

Fifth Embodiment

In the description of the above-described embodiments, it is preferable that the handwriting be erasable. In this embodiment, the synchronization between the erase operation for the handwriting and the handwriting data is described.

For example, it is assumed that the pen 30 is a writing instrument similar to a marker pen and the writable area 18 correspondingly has a surface similar to that of a marker board.

As the eraser for conventional whiteboards, an elastic member made of a material such as urethane with a raised fiber surface covering around it is typically used. Wiping the handwriting in the writable area 18 by using an eraser made of a material similar to that of a marker pen removes the handwriting.

The handwriting on the writable area 18 can be erased by using such a conventional eraser, but the handwriting data cannot be updated synchronously with the erase operation for the handwriting. To synchronize the erase operation with the handwriting data, it is necessary to use an eraser whose position coordinates can be detected by the coordinate detection section 11.

Figure 10A:
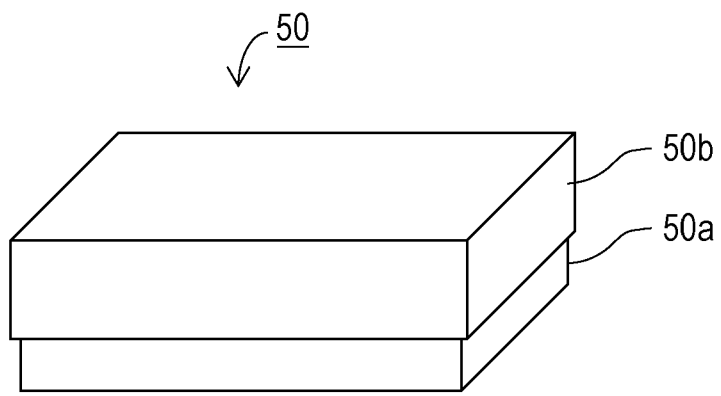
FIGS. 10A to 10C illustrate examples of a configuration of an eraser according to a fifth embodiment.
Figure 10B:
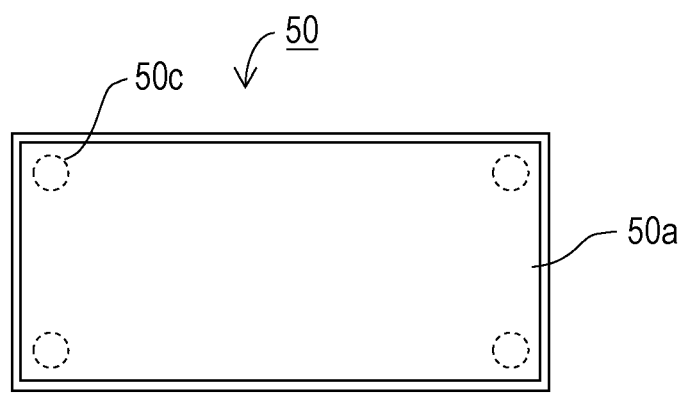
Figure 10C:
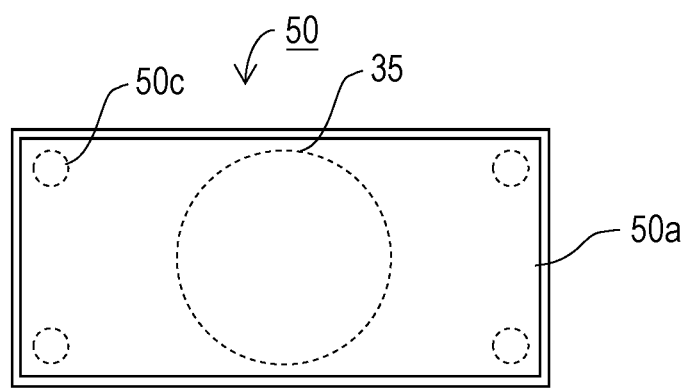

FIGS. 10A to 10C illustrate examples of a configuration of an eraser according to this embodiment. As illustrated in FIG. 10A, an eraser 50 has an erase portion 50a and a holding portion 50b. The erase portion 50a is formed such that a raised fiber surface covers an elastic member in a cuboid shape as the core member. Its exterior and the material of the surface are the same as those of the eraser for conventional whiteboards.

The eraser according to this embodiment differs from the conventional eraser in that a dielectric 50c that can be detected by the coordinate detection section 11 is disposed at, least each of the four corners of the core member on the lower surface of the erase portion 50a (see FIG. 10B). The dielectrics 50c are disposed such that, when the lower surface of the eraser 50 is in contact with the board 10, the coordinate detection section 11 detects each of the positions of the four corners of the erase portion 50a. A metal object may be used instead of the dielectric if the coordinate detection section 11 can detect the metal object.

Because the capacitance-type touch panel enables multi-touch detection, the positions of the dielectrics 50c disposed at the four corners of the eraser 50 can be detected. For example, in a case where the coordinate detection section 11 simultaneously detects position coordinates of four positions in an area with a predetermined size, it may be determined that the detection result indicates not the pen 30 nor a finger but the eraser 50. In such a manner, the eraser 50 can be distinguished from the pen 30 or a finger.

In a case where the eraser 50 is recognized and it is detected that the positions of four dielectrics moves on the board, the handwriting data within the area where a rectangular region moves is erased, where the rectangular region is obtained by connecting the position coordinates of the four dielectrics with straight lines. With this processing, synchronously with the erase operation for the handwriting in the writable area 18, the corresponding portion of the handwriting data can be deleted.

As illustrated in FIG. 10C, the resonance circuit 35 as the identification circuit may be disposed on the elastic member of the eraser 50 in addition to the dielectric 50c. Since a particular resonant frequency $f_0$ is assigned to the eraser 50, the eraser 50 can be reliably distinguished from the pen 30 or a finger by using an identification signal.

When the conventional whiteboard is used, users often wipe the whiteboard with a finger without using an eraser to erase the handwriting. This is because erasing with a finger is easier when erasing a small area.

In this embodiment, because the coordinate detection section 11 is a capacitance-type touch panel, the contact of a finger as a dielectric can be detected. Furthermore, in accordance with the capacitance, a finger and the pen 30 can be distinguished from each other. Similarly, a finger and the eraser 50 can be distinguished from each other.

As a result, synchronously with the operation for erasing the handwriting by using a finger, a corresponding portion of the handwriting data can be deleted.

Sixth Embodiment

As a modified example of the configuration of the board 10 described in the first embodiment, a mode in which an induction coil is provided in addition to the X parallel electrode 13x may be considered. In this case, the loop switching circuit 16 described in the first embodiment is unnecessary, and the X parallel electrode 13x and the X detection drive circuit 14x are used only for the coordinate detection section 11.

Without using them, an electrode as an induction coil and a drive circuit are added as components for the pen identification section 12. The detection of the induction coil is performed by the X detection circuit 15x described in the first embodiment.

The induction coil according to this embodiment is embedded at a depth different from those of both the X parallel electrode 13x and the Y parallel electrode 13y. Hence, the induction coil is out of contact with the X parallel electrode 13x and the Y parallel electrode 13y.

Seventh Embodiment

This embodiment describes the processing for generating and updating the handwriting data performed by the controller 20 in a case where the controller 20 is included in the handwriting input system. It is noted that the same processing for generating and updating the handwriting data is performed even in a case where the controller 20 exists outside the system.

Figure 11:
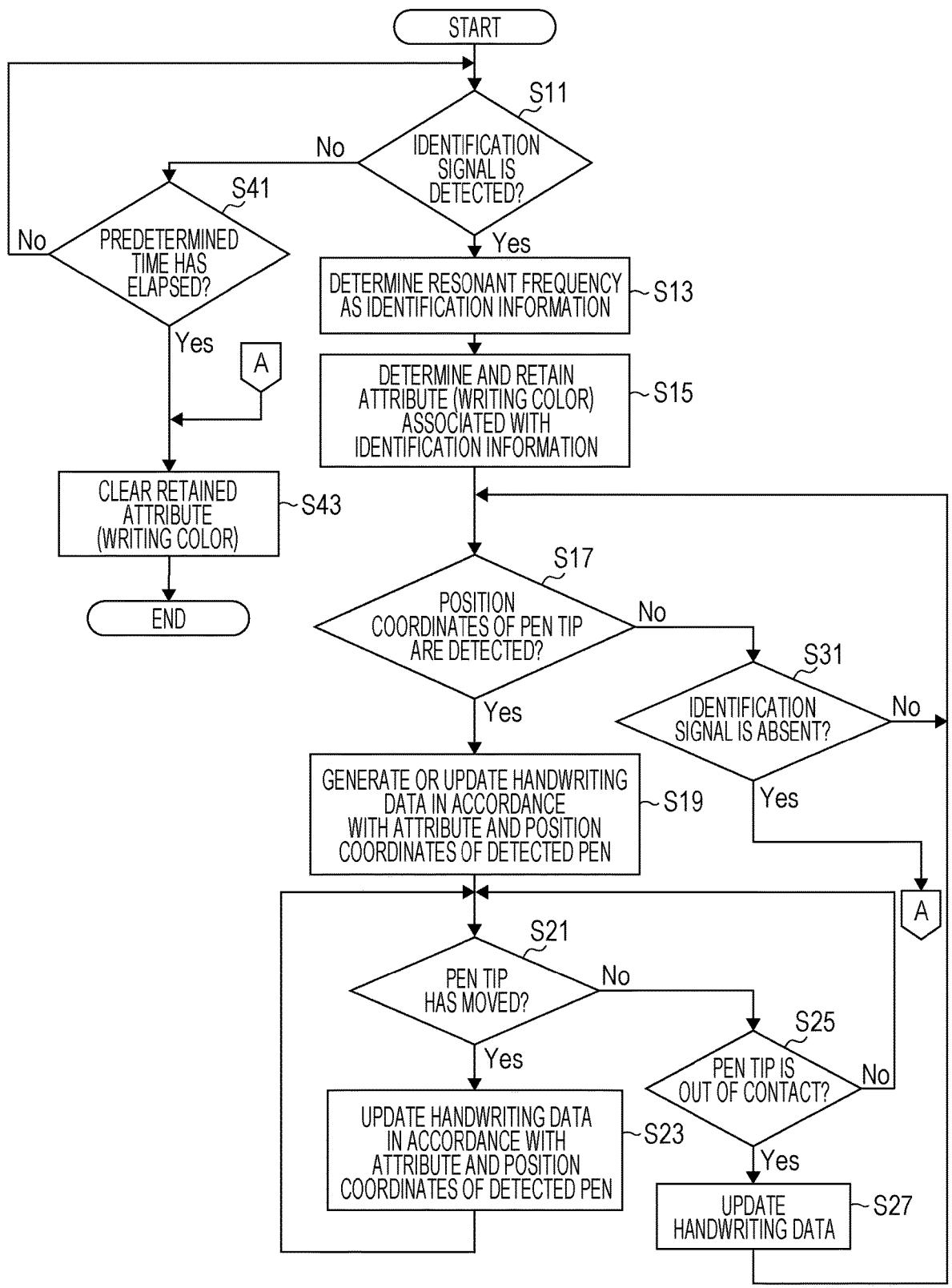
FIG. 11 is a flowchart illustrating processing for generating and updating handwriting data performed by a controller according to a seventh embodiment.

FIG. 11 is a flowchart illustrating the processing for generating and updating the handwriting data performed by the controller 20 according to this embodiment. The processing illustrated in FIG. 11 is performed in parallel with other tasks in the multitasking environment. In addition, after a series of processing operations for the task is completed, the task starts again.

After the task starts processing, the controller 20 observes the detection of an identification signal performed by the pen identification section 12 and the detection of position coordinates performed by the coordinate detection section 11 and performs processing according to those detections.

For ease of understanding, FIG. 11 illustrates only the processing relating to writing and omits the processing relating to the erase operation of the handwriting. Those skilled in the art would easily understand the erase processing in accordance with the processing for writing illustrated in FIG. 11 and the description of the fifth embodiment.

First, the controller 20 determines whether an identification signal is detected by the pen identification section 12 (step S11).

In a case where an identification signal is detected (Yes in step S11), the identification information associated with the identification signal is obtained (step S13). More specifically, when the identification circuit is the resonance circuit 35 as described in the first embodiment, the pen identification section 12 drives an induction coil at different drive frequencies and determines that which frequency causes resonance. The determination processing is sequentially performed for each induction coil. When it is determined that resonance occurs in an induction coil, in other words, when an identification signal is detected, it is determined that the pen 30 exists near the area where the induction coil exists. The driving frequency at which the resonance occurs, that is, the resonant frequency $f_0$ is obtained as the identification information.

Here, since the coordinate detection section 11 as a capacitance-type touch panel can detect multi-touch input, even if multiple persons write at different positions of the writable area 18 at the same time, the coordinate detection section 11 can detect each writing. To respond to the multi-touch detection function of the coordinate detection section 11, the pen identification section 12 is formed such that multiple induction coils are arrayed at different positions in the X direction (the horizontal direction). The approximate position of the pen 30 in the X direction can be determined by which induction coil detects an identification signal.

According to the configuration of the first embodiment illustrated in FIGS. 1, 3, and 4, the pen identification section 12 can detect a position in the X direction but cannot detect a position in the Y direction. However, if the board 10 can be hung on a wall as illustrated in FIG. 2, when multiple persons write on the board 10 at the same time, writing is performed at different positions in the X direction. Therefore, detecting positions in the X direction is sufficient. The pen identification section 12 may be configured to also detect a position in the Y direction by adding, with respect to the Y direction, circuits corresponding to the loop switching circuit 16, the X detection drive circuit 14x, and the X detection circuit 15x, which are illustrated in FIG. 3.

Returning to the description of the flowchart, the controller 20 obtains the attributes of the pen 30 defined in association With the resonant frequency as illustrated in FIGS. 6A and 6B. While the identification signal is being detected, a memory retains the data of the attributes (step S15).

The controller 20 then determines whether the coordinate detection section 11 detects position coordinates of the pen tip 33 (step S17). In a case where the position coordinates of the pen tip 33 are detected (Yes in step S17), the handwriting data is generated in accordance with the detected position coordinates of the pen and the attributes whose data is retained in the memory. Otherwise, the generated handwriting data is updated (step S19).

Subsequently, the controller 20 determines whether the position coordinates of the pen tip 33 have moved (step S21).

In a case where the pen tip 33 has moved (Yes in step S21), the handwriting data is updated in accordance with the position coordinates of the pen after moved and the attributes whose data is retained in the memory (step S23). The routine then returns to step S21 described above, and the controller 20 monitors the movement of the pen tip 33.

Conversely, in a case where it is determined in above-described step S21 that the pen tip 33 has not moved (No in step S21), the controller 20 further determines whether the pen tip 33 is out of contact with the board 10 (step S25).

In a case where the pen tip 33 is in contact with the board 10 (No in step S25), the routine returns to above-described step S21 and the controller 20 monitors the movement of the pen tip 33.

By contrast, in a case where the pen tip 33 is out of contact with the board 10 (Yes in step S25), the controller 20 updates the handwriting data (step S27). The routine then returns to above-described step S17, and the controller 20 monitors whether a new position of the pen tip 33 is detected.

In a case where the position coordinates of the pen tip 33 are not detected (No in step S17), the controller 20 determines whether the identification signal detected in step S11 is absent (step S31).

In a case where the identification signal remains to be detected (No in step S31), the routine returns to step S17 and waits for the detection of position coordinates of the pen tip 33.

Conversely, in a case where the detected identification signal is absent at the time (Yes in step S31), the routine proceeds to step S43 and the data of the attributes (for example, the writing color) of the pen 30 having been retained in the memory while the identification signal is being detected is cleared. The processing subsequently ends. After the processing ends, the task restarts repeatedly, and the detection of an identification signal continues successively.

In a case where any identification signal is not detected (No in step S11), the routine proceeds to step S41 and it is determined whether a predetermined time elapsed while any identification signal is not detected. In a case where the predetermined time has not elapsed (No in step S41), the routine returns to step S11 and waits for the subsequent detection of an identification signal.

In a case where the predetermined time has elapsed (Yes in step S41), the routine proceeds to step S43 and if an identification signal has been detected by then and the data of the attributes (for example, the writing color) of the pen 30 is retained in the memory, the data of the attributes is cleared. The processing subsequently ends. Since the task restarts repeatedly, the detection of an identification signal continues successively.

The processing for generating and updating the handwriting data performed by the controller 20 is as described above.

The handwriting input system of the present disclosure may have configurations described below.

(i) The handwriting input system includes a board for writing and a pen that serves as a writing instrument. The pen includes a pen tip that leaves visible handwriting on the board when the pen tip comes into contact with the board and an identification circuit that provides an identification signal. The board includes a coordinate detection section that detects position coordinates of a position on the board where the pen tip is in contact with the board and a pen identification section that detects the identification signal in a contactless manner.

The board of the handwriting input system according to the present disclosure is for writing performed by using a pen. It is preferable that the surface of the board be formed of a material similar to the conventional whiteboard or finished in the same manner as the conventional whiteboard, but the surface of the board may be different from that of the conventional whiteboard as long as writing can be performed on it by using a pen.

Furthermore, it is also preferable that the board be not disposable and the handwriting left on the board can be erased, more preferably, the handwriting can be erased in the same manner as that of the conventional whiteboard; in other words, from the usability perspective, it is preferable that handwriting can be erased by lightly wiping the board by using an eraser, and if it is a small area, a user can wipe the area by using their hand so that the handwriting is erased.

It is noted that handwriting here is a track of positions where a pen tip comes into contact with the board, or a trace that is left on the board by writing with a pen.

Furthermore, the pen of the handwriting input system is a writing instrument with which writing can be performed. It is preferable that ink similar to that of a marker pen for the conventional whiteboard be used for writing, but ink different from that of the marker pen for the conventional whiteboard may be used as long as it can be used for writing on the board, or a different principle may be employed for writing. It is noted that the different principle is not the one in which a board displays handwriting in accordance with the position of the pen tip such as the one using a display but the one in which the pen tip leaves visible handwriting at positions on the board where the pen tip comes into contact with the board.

Moreover, the pen tip is a portion that leaves visible handwriting when it comes into contact with the board. When the pen is a felt-tip pen similar to a conventional marker pen, the pen tip is the portion which comes into contact with the board and from which ink comes out and adheres to the board, that is, the exposed portion of a felt member impregnated with ink.

Further, the identification signal is used for distinguishing a pen from other pens with different attributes. The identification signal may be used for distinguishing a pen from another object such as an eraser other than pens.

The coordinate detection section detects the coordinates of a position where the pen tip comes into contact with the board, that is, position coordinates. The position coordinates are not detected if the pen tip is out of contact with the board, and therefore the position coordinates corresponding to handwriting can be detected.

(ii) The identification circuit may be disposed in an identification component that is attachable to and detachable from a body of the pen.

With this configuration, by attaching the identification component corresponding to the attributes of the pen, the attributes of the pen can be associated with the identification signal and data of handwriting in accordance with the attributes of the pen can be generated.

Further, if the identification component is attachable to a commercially available marker pen, a user can easily obtain a pen as a consumable item.

(iii) The identification signal may represent identification information for identifying at least one of a writing color of the pen, a size of the pen tip, and a shape of the pen tip.

With this configuration, by attaching the identification component corresponding to at least one of the writing color, the size of the pen tip, and the shape of the pen tip, the identification signal can be associated with at least one of the color of the handwriting, the thickness of the line of the handwriting, and the shape of the line of the handwriting. Accordingly, the handwriting data in accordance with not only the coordinates of a position where the pen tip comes into contact with the board but also at least one of the color, the thickness of the line and the shape of the line can be generated.

(iv) The pen tip may be wholly or partially constituted by a dielectric or a metal object. The coordinate detection section may operate as a capacitance-type touch panel that is embedded in the board and detects a contact of the pen tip. The identification circuit may be a resonance circuit having a unique resonant frequency. The pen identification section may include a detection drive circuit that drives an induction coil embedded in the board and a detection circuit that detects resonance inducted in the resonance circuit by driving the induction coil.

With this configuration, the capacitance-type touch panel detects the coordinates of a contact position of the pen tap, and a signal concerning a unique resonant frequency induced in the resonance circuit by driving the induction coil can be obtained as an identification signal.

The handwriting input system may include a controller that detects a resonant frequency of the resonance circuit by driving the induction coil at multiple frequencies by using the detection drive circuit and determining whether resonance occurs, that obtains predetermined identification information according to the resonant frequency, that obtains information of the position coordinates in accordance with a detection performed by the capacitance-type touch panel, and that generates handwriting data corresponding to the handwriting on the board in accordance with the identification information and the information of the position coordinates.

With this configuration, the controller detects the resonant frequency of the resonance circuit and obtains predetermined identification information according to the resonant frequency. Subsequently, information of the coordinates of a position where the pen tip is in contact with the capacitance-type touch panel is obtained and the handwriting data in accordance with the obtained position coordinates and the identification information can be generated.

(vi) The identification circuit may be disposed at a position that is on a pen tip side with respect to a center of the pen and that is closer than the pen tip to the center of the pen and provide the identification signal corresponding to at least one attribute of a writing color of the pen, a size of the pen tip, and a shape of the pen tip.

With this configuration, the identification signal associated with at least one of the color of the handwriting, the thickness of the line of the handwriting, and the shape of the line of the handwriting can be obtained from the identification circuit, and the handwriting data in accordance with not only the coordinates of the handwriting but also at least one of the color, the thickness of the line and the shape of the line can be generated.

The center of the pen here is a position in the middle between one end of the pen where the pen tip is present and the opposite end of the pen and at the equal distance from both of the ends.

The present disclosure contains subject matter related to that disclosed in Japanese Priority Patent Application JP 2018-032452 filed in the Japan Patent Office on Feb. 26, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A handwriting input system comprising:
   a writing instrument; and
   a board for writing, wherein
   the writing instrument includes a pen body, a pen tip that leaves visible handwriting on the board when the pen tip comes into contact with the board, and an identification component that is held in an area between a center of the pen body and the pen tip,
   the identification component includes:
      a resonance unit formed to have an external shape thinner than the writing instrument
      an identification circuit that outputs an identification signal used for identifying an attribute of the writing instrument; and
      a holding member that holds the resonance unit close to one end of the writing instrument where the pen tip is present to render a longitudinal direction of the resonance unit parallel to a longitudinal direction of the writing instrument,
   the holding member holds the identification component in a manner so as to be attachable and detachable to and from an outer surface of the writing instrument, and
   the board includes a pen identification controller that detects in a contactless manner an identification signal output by the identification component and a coordinate detection controller that detects position coordinates of a position on the board where the pen tip of the writing instrument is in contact with the board.

2. The handwriting input system according to claim 1, wherein the holding member holds the resonance unit to extend along an outer peripheral surface of the writing instrument.

3. The handwriting input system according to claim 1, wherein the resonance unit is constituted by a resonance coil including an iron core and a coil wound around the iron core.

4. The handwriting input system according to claim 1, wherein the resonance unit is attached to a holding portion that is held by a user when the user writes with the writing instrument.

5. The handwriting input system according to claim 1, wherein the holding member is constituted by a hook and loop fastener or an adhesive.

6. The handwriting input system according to claim 1, wherein the identification circuit is a resonance circuit corresponding to a particular resonant frequency.

7. The handwriting input system according to claim 1, wherein the identification signal represents identification information for identifying at least one of a writing color of the writing instrument, a size of the pen tip of the writing instrument, and a shape of the pen tip of the writing instrument.

* * * * *